United States Patent [19]

Winter et al.

[11] 4,218,553

[45] Aug. 19, 1980

[54] POLYMERIZATION OF VINYL CHLORIDE WITH $S_xO_y$ CONTAINING EMULSIFIERS

[75] Inventors: Hermann Winter; Gerhard Schröter; Wolfgang Jurgeleit, all of Marl; Josef Kalka, Herten; Bernhard Mihm, Marl, all of Fed. Rep. of Germany

[73] Assignee: Chemische Werke Hüls Aktiengesellschaft, Marl, Fed. Rep. of Germany

[21] Appl. No.: 867,570

[22] Filed: Jan. 6, 1978

Related U.S. Application Data

[63] Continuation of Ser. No. 585,700, Jun. 10, 1975, abandoned.

[30] Foreign Application Priority Data

Jun. 14, 1974 [DE] Fed. Rep. of Germany ....... 2428706

[51] Int. Cl.$^2$ .................. C08F 2/26; C08J 9/10
[52] U.S. Cl. ........................ 526/209; 521/72; 525/4; 526/225
[58] Field of Search ................ 526/209, 225

[56] References Cited

U.S. PATENT DOCUMENTS

| | | | |
|---|---|---|---|
| 3,120,505 | 2/1964 | McCubbin | 526/225 |
| 3,531,454 | 9/1970 | Ito | 526/209 |
| 3,546,193 | 12/1970 | Benetta | 526/225 |
| 3,639,297 | 2/1972 | Steffen | 260/2.5 P |
| 3,975,338 | 8/1976 | Tsubota | 526/345 |

*Primary Examiner*—C. A. Henderson
*Attorney, Agent, or Firm*—Millen & White

[57] ABSTRACT

Improved PVC polymers are prepared by an emulsion polymerization process using an emulsifier mixture comprising:
 (a) 70–30% by weight of an alkyl sulfate of the formula R—OSO$_3$Me wherein R is alkyl of 10–18 carbon atoms and Me is Na or K; and
 (b) correspondingly 30–70% by weight of at least one member selected from the group consisting of
  (i) 0–65% by weight of an alkyl ether sulfate of the formula R—(OCH$_2$—CH$_2$)$_n$—OSO$_3$Me wherein n is an integer of 1–5 inclusive and R and Me have the above-indicated values, and
  (ii) 0–60% by weight of a sodium alkyl sulfonate wherein the alkyl chain is of 10–20 carbon atoms.

5 Claims, No Drawings

POLYMERIZATION OF VINYL CHLORIDE WITH $S_xO_y$ CONTAINING EMULSIFIERS

This is a continuation or application Ser. No. 585,700, filed June 10, 1975, now abandoned.

BACKGROUND OF THE INVENTION

This invention relates to a process for the production of polyvinyl chloride and the use thereof for the manufacture of soft foam materials. More particularly, this invention relates to the use of an improved emulsifier system in such a process.

It is known to produce emulsifier-containing polyvinyl chloride (PVC) by continuous polymerization in emulsion. This process is carried out in the presence of water-soluble catalysts and generally in the presence of ionic emulsifiers such as alkyl sulfonates, alkylaryl sulfonates, alkyl sulfates, alkali salts of fatty acids, etc.

The thus-prepared polymer dispersion is generally worked up by spray-drying, forming finely grained powders which can be processed with plasticizers to pasty compositions capable of being cast, i.e., the so-called pastes or plastisols. Various processing methods are known for plastisols, e.g., casting processes such as rotational casting, dipping processes and spreading processes. Of particular interest is the manufacture of soft polyvinyl chloride foam in accordance with the spread-coating method. In this process, the plastisol paste can be combined with a blowing agent, e.g., azodicarbonamide. At the high temperatures, generally of 160°–240° C., in the gelling tunnel, the blowing agent is decomposed; the paste is foamed and simultaneously gelled, and a soft foam material is thus produced. This process has broad fields of application, for example in the manufacture of imitation leather. The chemical literature describes this spread-coating method for producing soft polyvinyl chloride from, e.g. in Kunststoffe, 52. Annual, (1962), Vol. 10, page 624–629.

In this spread-coating process, two properties of the spread-on foam are of great importance. On the one hand, the viscosity of the plastisol paste is desirably maximally low before gelling, i.e., as shown in example 1 to 5, determining the viscosities by means of a viscometer "Rotovisko RV 1" of the firm Haake with a measuring head 500 for a shearing range of 5–400 sec$^{-1}$ and a measuring head 50 with speed reducer 10 for a shearing range of 0.3–16 sec$^{-1}$. On the other hand, there is the requirement that even with a minimally brief residence time, e.g., of about 1.3 minutes, in the gelling tunnel a thoroughly foamed product be obtained having a fine, uniform pore structure, a low density and a smooth surface. Heretofore, it has been impossible to satisfy both demands simultaneously.

In the conventional utilization of alkyl sulfonates as the emulsifier in the production of polyvinyl chloride capable of plastisol formation (e.g., as described in U.S. Pat. No. 2,727,627), pastes are obtained having a satisfactory viscosity characteristic; however, it is impossible to produce a foam material with short residence times in the gelling tunnel, as can be seen from Example 5.

If alkyl sulfate is used conventionally as the emulsifier during the polymerization (e.g., as in French Pat. No. 977,296), a foam having satisfactory properties is formed from the paste prepared from this polymer even at brief residence times of 1.3 minutes, but the viscosity properties of the paste are unacceptable, as can be seen from the results set forth in Example 6.

OBJECTS OF THE INVENTION

Accordingly, it is a general object of this invention to provide an improved PVC plastisol which combines a low viscosity prior to gelling with the ability to form foamed products having a fine, uniform pore structure, a low density and a smooth surface after brief residence times in a gelling tunnel, and a process for the preparation thereof.

Another object of this invention is to provide an improved emulsion polymerization process for the preparation of such PVC plastisols.

A further object of this invention is to provide a multicomponent emulsifier system for use in such a process.

Upon further study of the specification and appended claims, other objects and advantages of the present invention will become apparent.

SUMMARY OF THE INVENTION

Briefly, the above and other objects are attained in one aspect of the present invention by providing, in a process for the continuous aqueous emulsion polymerization of vinyl chloride at a pH of 3–9 using a catalytic amount of a water-soluble vinyl chloride polymerization catalyst and an emulsifying amount of an emulsifier to form polyvinylchloride, the improvement which comprises conducting said polymerization in the presence of about 1.6–2.8% by weight, based on the vinyl chloride monomer, of an emulsifier system consisting essentially of (a) 70–30% by weight of an alkyl sulfate of the formula R-OSO$_3$-Me wherein R is alkyl of 10–18 carbon atoms and Me is Na or K; and (b) correspondingly 30–70% by weight of at least one member selected from the group consisting of
   (i) 0–65% by weight of an alkyl ether sulfate of the formula R—(OCH$_2$—CH$_2$)$_n$-OSO$_3$Me wherein n is an integer of 1–5 inclusive and R and Me have the above-indicated values, and
   (ii) 0–60% by weight of a sodium alkyl sulfonate wherein the alkyl chain is of 10–20 carbon atoms.

DETAILED DISCUSSION

These disadvantages of the prior art are overcome by a process for the production of polyvinyl chloride by the continuous emulsion polymerization of vinyl chloride monomer in the presence of a catalytic amount of a water-soluble catalyst and a monomer emulsifying amount of emulsifiers, which is carried out in the presence of 1.6–2.8% by weight, based on the total quantity of the charged monomer, of an emulsifier system comprising:

(a) 70–30% by weight of an alkyl sulfate of the formula R-OSO$_3$Me wherein R represents straight or slightly branched* alkyl residue of 10–18 carbon atoms and Me represents Na or K; and (b) correspondingly 30–70% by weight of at least one member selected from the group consisting of
   (i) 0–65% by weight of an alkyl ether sulfate of the formula R—(OCH$_2$—CH$_2$)$_n$—OSO$_3$Me wherein n is an integer from 1–5 inclusive and R and Me have the above-indicated values; and
   (ii) 0–60% by weight of a sodium alkyl sulfonate wherein the alkyl chain is straight or slightly branched and carries 10–20 carbon atoms.

*By "slightly branched" is meant in β-position (in the case that the base-alcohol is produced by the oxo-process)

A preferred embodiment of the process resides in that it is conducted in the presence of an emulsifier system of:
 60–33⅓% by weight of component (a);
 30–33⅓% by weight of component (i); and correspondingly
 10–33⅓% by weight of component (ii).

In a special embodiment of the process, it is carried out in the presence of an emulsifier system of:
 35–65% by weight of component (a); and correspondingly
 65–35% by weight of component (i).

In another special embodiment of the process, it is conducted in the presence of an emulsifier system of:
 40–60% by weight of component (a); and correspondingly
 60–40% by weight of component (ii).

The polymers produced according to this invention can be advantageously used for the manufacture of soft foam materials by the spread-coating process with the aid of chemical blowing agents. The thus-obtained products show good to excellent viscosity characteristics of the plastisols and result in foam materials having satisfactory to very good foam properties, even in case of short residence times in the gelling tunnel (e.g., of about 1.3 minutes) at 200°–210° C.

Suitable alkyl sulfates which can be used as emulsifiers according to this invention are known in the art and include but are not limited to sodium decyl sulfate, sodium lauryl sulfate, sodium tetracedyl sulfate, sodium cetyl sulfate, sodium stearyl sulfate, etc. For reasons of ready commercial availability and lower cost, it will frequently be expedient to use, instead of individual compounds, the sodium salts of sulfates of $C_{10}$–$C_{18}$ alcohol mixtures. Advantageously, mixtures are employed wherein lauryl sulfate is predominant in quantity, i.e., constitutes at least 92%, preferably at least 98% by weight thereof.

A preferred alkyl ether sulfate is the sodium salt of lauryl ether sulfates. The number of ether groups is suitably 1–5, preferably 2–3. Suitable alkyl ether sulfates are likewise known in the art and include but are not limited to sodium lauryl dioxyethyl sulfate, sodium lauryl trioxyethyl sulfate, sodium lauryl tetraoxyethyl sulfate, sodium lauryl pentaoxyethyl sulfate, etc. Corresponding ether derivatives can be derived from sodium decyl sulfate, sodium tetradecyl sulfate, sodium cetyl sulfate and sodium stearyl sulfate. For practical and economic reasons, alcohol mixtures having a carbon atom number of 10–18 will often be utilized as starting materials to prepare these compounds. Preferably, such starting mixtures will contain similarly a predominant amount of lauryl alcohol.

Alkali salts of alkyl sulfonates which can be used in accordance with this invention are the ammonium and alkali metal salts, preferably sodium salts, of hydrocarbon sulfonates containing 10–20 carbon atoms, e.g., decane, dodecane, heptadecane, hexadecane and octadecane. In general, mixtures will be utilized for the sulfoxidation or sulfochlorination, preferably those having a maximum (at least 50% by weight thereof) at $C_{15}/C_{16}$. One suitable method for the production of these sulfonates can be found in F. Asinger, "Chemie und Technologie der Paraffin-Kohlenwasserstoffe" [Chemistry and Technology of the Paraffin Hydrocarbon], pp. 453–465, published by Akademie-Chemie Berlin, 1956.

During polymerization, the pH is maintained between 3 and 9, preferably at about 5 to 7. To adjust the pH value, sufficient amounts of various buffer substances can be employed as is known in the art, e.g. alkali phosphates or sodium acetate.

The concentration of the buffer is not critical so long as the pH is properly controlled, but is generally 0.001 to 1.0% by weight, preferably 0.01–0.5%, based on the vinyl chloride monomer charged.

The emulsifiers and buffers are dissolved in demineralized water, so that the solids content of emulsifier and buffer substance in the water is 1.6–2.5% by weight, preferably 1.9–2.3%. The emulsifier content, based on the vinyl chloride, is an emulsifying amount thereof, generally 1.6–2.8, preferably 1.9–2.6% by weight.

The phase ratio (based on volume) of vinyl chloride to emulsifier and water is generally 1:0.7 to 1:2. Normally, it is desirable to adjust the phase ratio if at all possible so that the solids content in the dispersion is more than 48% by weight.

The polymerization is then conducted conventionally using a catalytic amount of one or more water-soluble free radical or redox activators introduced as an aqueous solution. Preferably, potassium persulfate or ammonium persulfate is employed, with or without a reducing agent. The concentration of potassium persulfate can be 0.001 to 1%, based on the vinyl chloride, and is preferably 0.01–0.5%. It is also possible to polymerize with hydrogen peroxide and with a reducing agent such as ascorbic acid. The concentration of $H_2O_2$ is 0.001 to 0.02%, preferably 0.01–0.02%.

The solution of emulsifier in water, (the so-called emulsifier water) the vinyl chloride and the activator solution are introduced continuously into the polymerization reactor so that an average residence time of about 6–7 hours is obtained.

The polymerization temperature, depending on the desired molecular weight of the polymer, is 40°–60° C. and generally the pressure is correspondingly 4–6 atmospheres gauge. The dispersion is worked up conventionally, e.g., by means of spray-drying.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

(According to the Invention)

The polymerization is conducted continuously in an autoclave having a capacity of 3 m³. The following amounts are fed:

| | |
|---|---|
| Vinyl chloride: | 210 l./h. |
| Emulsifier water: | 183 l./h. |
| Composition of the emulsifier water: | |
| 1.2% lauryl sulfate | |
| 0.6% lauryl ether sulfate | |
| 0.2% alkyl sulfonate (chain length of the alkyl residue $C_{10}$ to $C_{20}$ with a maximum at $C_{15}$ to $C_{20}$) | |
| 0.1% sodium acetate | |
| remainder water | |
| Activator: | 2.0 l./h. (3% solution of $K_2S_2O_8$ in water) |

-continued

| | |
|---|---|
| Polymerization temperature: | 50° C. |
| Polymerization pressure: | about 5 atm. gauge |
| Solids content of dispersion: | 48% |
| K-Value: | 70 |

The dispersion is worked up in a spray-drying plant. The inlet temperature of the drying air is about 160° C., the tower outlet temperature is 60° C. Otherwise the product is worked up as described in DOS [German Unexamined Laid-Open Application] No. 2,146,753.

The paste viscosity is measured on a plasticizer batch with 65 parts of polyvinyl chloride powder and 35 parts of dioctyl phthalate by means of a Haake viscometer.

| | 0.27 sec$^{-1}$ | 1.63 sec$^{-1}$ | 44 sec$^{-1}$ |
|---|---|---|---|
| 2 hr. | 300 | 180 | 90 |
| 24 hr. | 500 | 260 | 120 |
| 7 days | 600 | 320 | 130 |

To test the foaming properties and the polyvinyl chloride foam, a paste having the following recipe is prepared:
  100 parts polyvinyl chloride
  54 parts dioctyl phthalate
  30 parts benzylbutyl phthalate
  3 parts azodicarbonamide
  2 parts Cd/Zn stabilizer (BÄROSTAB KK 76 of the Company Chemische Werke München; 3% Cd, 10% Zn)
  1 part TiO$_2$ After a storage period of 18 hours, the pastes are spread onto a release paper and gelled and expanded in a nozzle gelling tunnel, varying the residence time and temperature.

The density, the pore structure, and the surface of the PVC foam are evaluated. At a foaming temperature of 200° C., the following results are obtained:

| | | |
|---|---|---|
| Residence time: | 2 min. | 1.3 min. |
| Density (g./cm$^3$): | 0.26 | 0.32 |
| Pore structure: | fine-pored | fine-pored |

As can be seen, excellent paste viscosities as well as good foam properties are obtained according to this invention even with a very short residence time of 1.3 minutes which is technically of great interest.

EXAMPLE 2

(According to the Invention)

The polymerization and working-up steps are conducted as described in Example 1. However, the emulsifier water has the following composition:
  0.66% lauryl sulfate
  0.66% lauryl ether sulfate
  0.66% alkyl sulfonate (chain length of the alkyl residue C$_{10}$ to C$_{20}$ with a maximum at C$_{15}$ to C$_{20}$)
  0.1% sodium acetate remainder water The paste viscosity is measured as set out in Example

| | 0.27 sec$^{-1}$ | 1.65 sec$^{-1}$ | 44 sec$^{-1}$ |
|---|---|---|---|
| 2 hr. | 300 | 160 | 90 |
| 24 hr. | 325 | 180 | 100 |
| 7 days | 475 | 240 | 110 |

The foaming properties are tested as in Example 1:

| | | |
|---|---|---|
| Residence time: | 2 min. | 1.3 min. |
| Density (g./cm$^3$): | 0.26 | 0.31 |
| Pore structure: | fine-pored | medium-pored |

With very good paste viscosities, foams are obtained having a uniform structure which only at the shortest residence time of 1.3 minutes cannot be called pronouncedly fined-pored.

EXAMPLE 3

(According to the Invention)

The polymerization and working-up steps are conducted as set forth in Example 1. The emulsifier water has the following composition:
  1% lauryl sulfate
  1% lauryl ether sulfate
  0.1% sodium acetate
  remainder water.

The paste viscosity is measured as in Example 1.

| | 0.27 sec$^{-1}$ | 1.65 sec$^{-1}$ | 44 sec$^{-1}$ |
|---|---|---|---|
| 2 hr. | 750 | 320 | 100 |
| 24 hr. | 810 | 360 | 120 |
| 7 days | 900 | 400 | 140 |

The foaming properties are tested as described in Example 1:

| | | |
|---|---|---|
| Residence time: | 2 min. | 1.3 min. |
| Density (g./cm$^3$): | 0.28 | 0.34 |
| Pore structure: | fine-pored | fine-pored |

With a satisfactory viscosity characteristic of the paste, foams are produced having very good properties even after maximally short residence times.

EXAMPLE 4

(According to the Invention)

The polymerization and working-up steps take place as set forth in Example 1. The emulsifier water has the following composition:
  1% lauryl sulfate
  1% alkyl sulfonate (chain length of the alkyl residue C$_{10}$–C$_{20}$ with a maximum at C$_{10}$–C$_{15}$)
  0.1% sodium acetate remainder water.

The paste viscosity is measured as in Example 1.

| | 0.27 sec$^{-1}$ | 1.65 sec$^{-1}$ | 44 sec$^{-1}$ |
|---|---|---|---|
| 2 hr. | 580 | 250 | 94 |
| 24 hr. | 675 | 300 | 108 |
| 7 days | 1000 | 450 | 150 |

The foaming properties are tested as described in Example 1:

| | | |
|---|---|---|
| Residence time: | 2 min. | 1.3 min. |
| Density (g./cm$^3$): | 0.30 | 0.46 |

| Pore structure: | fine-pored | medium-pored |
|---|---|---|

Satisfactory paste viscosities are obtained and, even with a minimum residence time, foams with satisfactory properties.

EXAMPLE 5

(Comparative Example)

Polymerization and working-up step are conducted as in Example 1. However, the emulsifier water contains only 2% alkyl sulfonate with a C-cut of $C_{10}$–$C_{20}$ with a maximum at $C_{15}$–$C_{20}$.

The paste viscosity is measured on a plasticizer batch with 60 parts of PVC powder and 40 parts of dioctyl phthalate by means of a Haake viscometer.

|  | 0.27 sec$^{-1}$ | 1.65 sec$^{-1}$ | 44 sec$^{-1}$ |
|---|---|---|---|
| 2 hr. | 480 | 280 | 130 |
| 24 hr. | 700 | 360 | 150 |
| 7 days | 1000 | 420 | 170 |

The foaming properties are tested as in Example 1:

| Residence time: | 2 min. | 1.3 min. |
|---|---|---|
| Density (g./cm$^3$): | 0.30 | 0.64 |
| Pore structure: | fine-pored | not expanded |

Although the paste viscosities are satisfactory, according to the prior art, no foam can be obtained from the paste in technically significant, short residence times.

EXAMPLE 6

(Comparative Example)

The polymerization and working-up steps are carried out as set forth in Example 1. However, the emulsifier water contains only 2% lauryl sulfate and 0.1% sodium acetate.

The paste viscosity is measured as in Example 1.

|  | 0.27 sec$^{-1}$ | 1.65 sec$^{-1}$ | 44 sec$^{-1}$ |
|---|---|---|---|
| 2 hr. | 1600 | 1100 | 900 |
| 24 hr. | 1780 | 1200 | 1000 |
| 7 days | 2500 | 1800 | 1400 |

The foaming properties are tested as described in Example 1:

| Residence time: | 2 min. | 1.3 min. |
|---|---|---|
| Density (g./cm$^3$): | 0.26 | 0.30 |
| Pore structure: | fine-pored | fine-pored |

It is found that the foam properties are satisfactory, but the viscosity characteristic is completely inadequate.

EXAMPLE 7

(Comparative Example)

The polymerization and working-up steps are conducted as in Example 1. However, the emulsifier water contains only 2% lauryl ether sulfate and 0.1% sodium acetate.

The paste viscosity is measured as in Example 1:

|  | 0.27 sec$^{-1}$ | 1.65 sec$^{-1}$ | 44 sec$^{-1}$ |
|---|---|---|---|
| 2 hr. | 305 | 150 | 65 |
| 24 hr. | 340 | 170 | 72 |
| 7 days | 410 | 200 | 85 |

The foaming properties are tested as in Example 1:

| Residence time: | 2 min. | 1.3 min. |
|---|---|---|
| Density (g.cm$^3$): | 0.23 | 0.30 |
| Pore structure: | coarse-pored | coarse-pored |

It is found that the paste viscosity is satisfactory, but the foam characteristics are deficient.

By working up of the dispersion by spray drying the emulsifiers remain in the polyvinyl chloride. The improved properties of the polyvinyl chloride produced by the invention, compared with that of the prior art, (as shown by the examples 1–4 compared with 5–7) are caused by the emulsifiers left in the polymer.

EXAMPLE 8

Foam-producing and Gelling

To show the particular foaming qualities and the wide space in manufacturing possibilities of the polyvinyl chloride obtained by the process of the invention, plastisols of various plasticizer content are produced and are gelled and foamed at a temperature of 180°, 200° and 220° C. The following formulas are produced:

|  | (parts by weight) | | |
|---|---|---|---|
| Plastisol | A | B | C |
| PVC (according Example 1) | 100 | 100 | 100 |
| Di-ethylhexyl phthalate | 54 | 44 | 35 |
| Benzyl butyl phthalate | 25 | 20 | 16 |
| Azodicarbonamid (1:1 in DOP) | 6 | 6 | 6 |
| Cd-Zn-kicker (Sicostab M 64; 4% Cd, 11% Zn) | 1,5 | 1,5 | 1,5 |

Polyvinyl chloride rejecting papers are coated with the plastisols with a thickness of layer of 1 mm and are heated in a nozzle gelling tunnel, varying the temperature (180°, 200°, 220° C.). The passing velocity of the coated papers is varied, effecting residence times in the gelling tunnel of 1, 1.3, 2, 4, and 8 minutes. The following table shows the foaming grade (multipliing of the original volume) effected by the various residence times:

|  |  | 180° C. | | | 200° C. | | | 220° C. | | |
|---|---|---|---|---|---|---|---|---|---|---|
| Plastisol Formulation |  | A | B | C | A | B | C | A | B | C |
| Residence Time [min] | 1.0 min | — | — | — | — | — | — | 3.5 | 3.0 | 3.0 |
|  | 1.3 min | — | — | — | 3.5 | 3.5 | 3.5 | 4.5 | 4.5 | 4.5 |
|  | 2.0 min | 3.5 | 3.0 | 3.0 | 4.5 | 4.0 | 4.0 | 6.5 | 6.5 | 6.0 |
|  | 4.0 min | 4.5 | 4.5 | 3.5 | 5.5 | 6.0 | 6.0 | 6.5 | 6.5 | 6.5 |
|  | 8.0 min | 6.0 | 5.5 | 5.0 | 6.0 | 6.0 | 6.5 | — | — | — |

The whole number of the so produced samples are perfectly microporous. As the table shows, a good foaming is effected even at 180° C. in relatively short residence times (1:3.5 in 2 minutes, corresponding to a foam density of 0.34 g/cm$^3$).

On the other hand, even at high temperatures and long residence times no "Overfoaming" occures, that means no coarse-pored foam material is produced. It is an additional advantage of the foam material according to the invention that even at extreme temperature conditions (high temperatures and long residence times) no collapse of the foam structure occurs, being indicated by diminution of the foaming grade. This insensibility to variations of the manufacturing conditions is of significant importance in the practice because of the permanent variations of the temperatures in gelling tunnels.

An additional advantage of the foam material according to the invention is their smooth surface structure.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the continuous aqueous emulsion polymerization of vinyl chloride at a pH of 3–9 using a catalytic amount of a water-soluble vinyl chloride polymerization catalyst and an emulsifying amount of an emulsifier to form polyvinylchloride, the improvement which comprises conducting said polymerization in the presence of about 1.6–2.8% by weight, based on the vinyl chloride monomer, of an emulsifier selected from:
   (a) 35–65% by weight of an alkyl sulfate of the formula $R-OSO_3Me$ wherein R is alkyl of 10–18 carbon atoms and Me is Na or K; and (b) (i) 65–35% by weight of an alkyl ether sulfate of the formula $R-(OCH_2-CH_2)_n-OSO_3Me$ wherein n is an integer of 1–5 inclusive and R and Me have the above-indicated values; or
   (a) 40–60% by weight of an alkyl sulfate of the formula $R-OSO_3Me$ wherein R is alkyl of 10–18 carbon atoms and Me is Na or K; and (b) (ii) 60–40% by weight of a sodium alkyl sulfonate wherein the alkyl chain is of 10–20 carbon atoms.

2. A process according to claim 1, wherein said emulsifier system consists essentially of
   60–33⅓% by weight of component (a);
   30–33⅓% by weight of component (i); and
   10–33⅓% by weight of component (ii).

3. A process according to claim 1 containing both (b) (i) and (b) (ii).

4. A process according to claim 1, wherein the solids content of the polymerization dispersion is greater than 48% by weight.

5. A process according to claim 1, wherein the phase ratio by volume of vinyl chloride to aqueous phase is about 1:0.7 to 1:2.

* * * * *